(12) United States Patent
Zhang et al.

(10) Patent No.: US 11,772,135 B2
(45) Date of Patent: Oct. 3, 2023

(54) AIR NOZZLE AND METHOD FOR MANUFACTURING THE SAME

(71) Applicant: Tyco Electronics (Shanghai) Co. Ltd., Shanghai (CN)

(72) Inventors: Jialin Zhang, Shanghai (CN); Jinlong Li, Shanghai (CN); Dan Li, Shanghai (CN); Zhongxi Huang, Shanghai (CN); Jiankun Zhou, Shanghai (CN); Daiqiong Zhang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 296 days.

(21) Appl. No.: 17/336,548

(22) Filed: Jun. 2, 2021

(65) Prior Publication Data

US 2021/0370360 A1    Dec. 2, 2021

(30) Foreign Application Priority Data

Jun. 2, 2020    (CN) .......................... 202010488669.5

(51) Int. Cl.
*B08B 5/02*    (2006.01)
*B05B 1/04*    (2006.01)
*F04F 5/16*    (2006.01)
*B33Y 10/00*    (2015.01)
*B33Y 80/00*    (2015.01)
*B29C 64/40*    (2017.01)

(52) U.S. Cl.
CPC ................ *B08B 5/02* (2013.01); *B05B 1/044* (2013.01); *F04F 5/16* (2013.01); *B29C 64/40* (2017.08); *B33Y 10/00* (2014.12); *B33Y 80/00* (2014.12)

(58) Field of Classification Search
CPC ......... B33Y 30/00; B33Y 10/00; B33Y 80/00; F04F 5/16; B08B 5/02; B05B 1/14; B05B 1/005; B05B 1/044; B29C 64/40; B29C 64/386
See application file for complete search history.

(56) References Cited

U.S. PATENT DOCUMENTS 4,875,990 A  * 10/1989  Kodachi ............ G01N 27/4067
                                                    204/426
6,986,739 B2 *  1/2006  Warren .................. C12M 33/00
                                                    118/683
10,254,499 B1 *  4/2019  Cohen .................... B33Y 70/10

* cited by examiner

*Primary Examiner* — Igor Kershteyn
(74) *Attorney, Agent, or Firm* — Barley Snyder

(57) ABSTRACT

An air nozzle includes a main body having a compressed air passageway to allow a compressed air to flow therethrough and a compensation air passageway in communication with the compressed air passageway. An external air is sucked into the compressed air passageway through the compensation air passageway and ejected together with the compressed air when the compressed air flows through the compressed air passageway.

20 Claims, 3 Drawing Sheets

AIR NOZZLE AND METHOD FOR MANUFACTURING THE SAME

CROSS-REFERENCE TO RELATED APPLICATIONS

This application claims the benefit of the filing date under 35 U.S.C. § 119(a)-(d) of Chinese Patent Application No. CN 202010488669.5, filed on Jun. 2, 2020.

FIELD OF THE INVENTION

At least one embodiment of the present disclosure relates to an air nozzle and a method for manufacturing the same.

BACKGROUND

In continuous electroplating production lines, it is necessary to use an air nozzle (also referred to as an air knife module) to spray a compressed air onto a surface of a workpiece to blow off a residual plating solution or other fluid on the surface of the workpiece. In this way, cross-contamination of the plating solution may be avoided between a previous process and a subsequent process. It is very important to correctly use the air nozzle to improve electroplating quality. A compressed air source is usually required. Therefore, utilization rate of the compressed air by the air nozzle will directly affect the electroplating quality and energy consumption cost of a product.

In the related art, the common air nozzle is relatively simple in structure which includes only one or more single communication flow passageway(s), and the flow passageway is typically diverted at a right-angle, which is not desirable for the utilization rate of the compressed air.

In the related art, generally, two methods for manufacturing the air nozzle are proposed, including a direct machining method or a batch injection-assembly method. In the direct machining method, a traditional machining or computerized numerical control machining center is typically used to reduce materials of a plastic block or a pipe. However, a complicated flow passageway cannot be processed in batch by this method. Therefore, there are differences between processing operators or devices. In the injection-assembly method, the whole or some of parts of the air knife are formed through a batch injection molding, with assistance of necessary assembling processes. The whole injection molding method has the similar limitations to the machining method, and can only process the relatively simple flow passageways. In the injection-assembly method in which several parts are disassembled and are subjected to respective injection molding processes and then are assembled together through necessary assembling processes, sealing performance may be adversely affected by the assembly processes. For example, the compressed air may be wasted due to insufficient tightening of screws, unsealed connections of the part or the like.

SUMMARY

An air nozzle includes a main body having a compressed air passageway to allow a compressed air to flow therethrough and a compensation air passageway in communication with the compressed air passageway. An external air is sucked into the compressed air passageway through the compensation air passageway and ejected together with the compressed air when the compressed air flows through the compressed air passageway.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
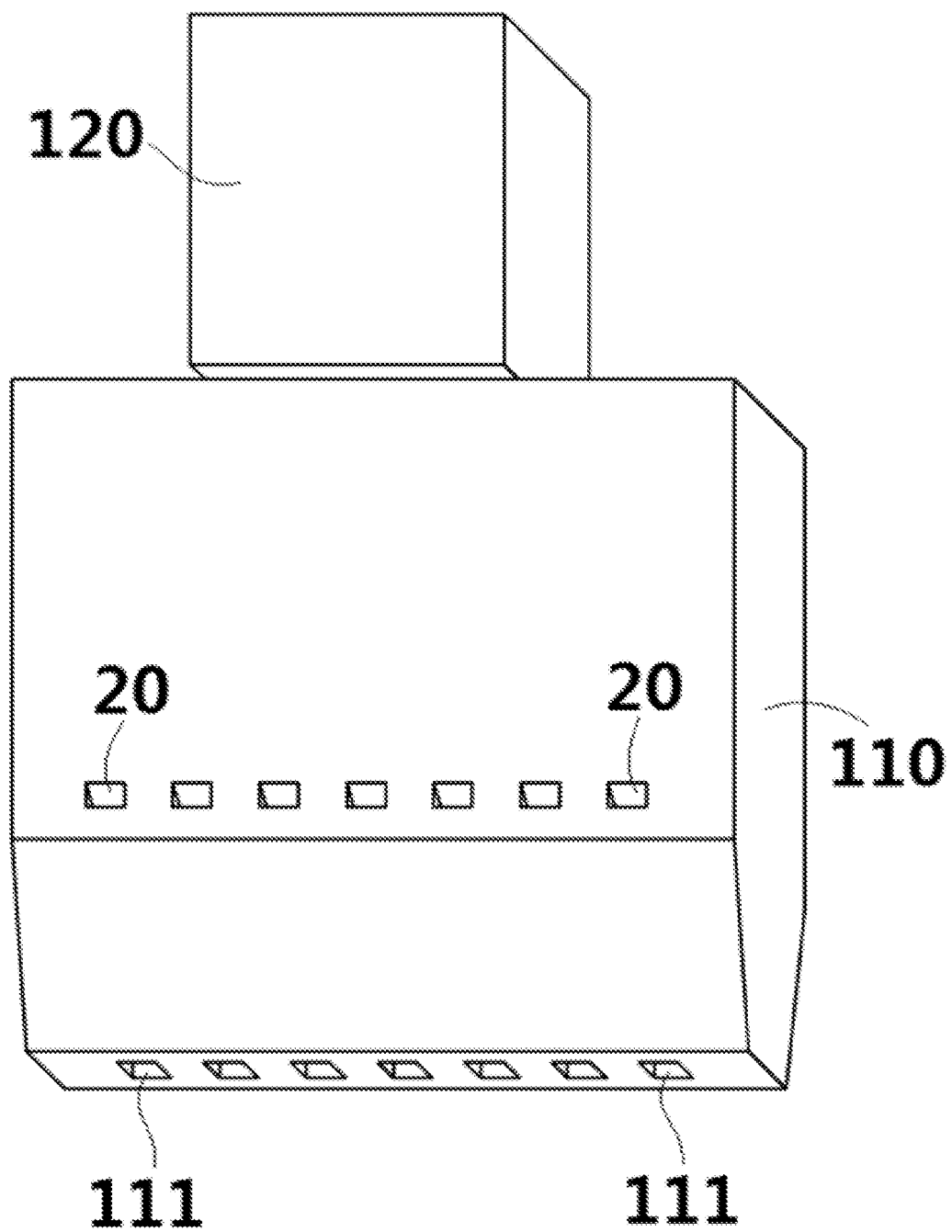
FIG. 1 is a perspective view of an air nozzle according to an embodiment.

Embodiments of the present disclosure will be described hereinafter in detail taken in conjunction with the accompanying drawings. In the description, the same or similar parts are indicated by the same or similar reference numerals. The description of the embodiments of the present disclosure hereinafter with reference to the accompanying drawings is intended to explain the general inventive concept of the present disclosure and should not be construed as a limitation on the present disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

Figure 2:
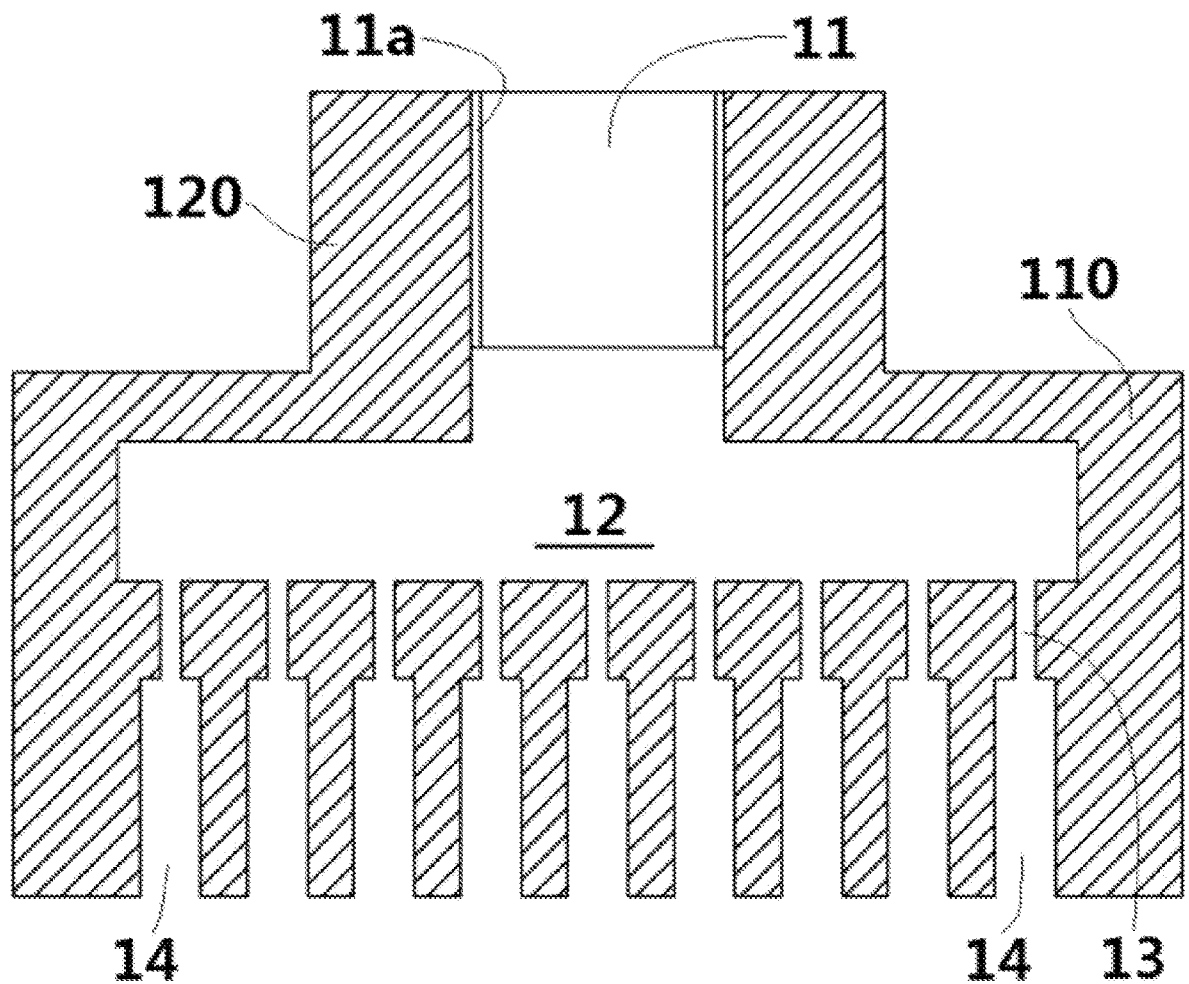
FIG. 2 is a sectional side view of the air nozzle of FIG. 1 in a width direction.
Figure 3:
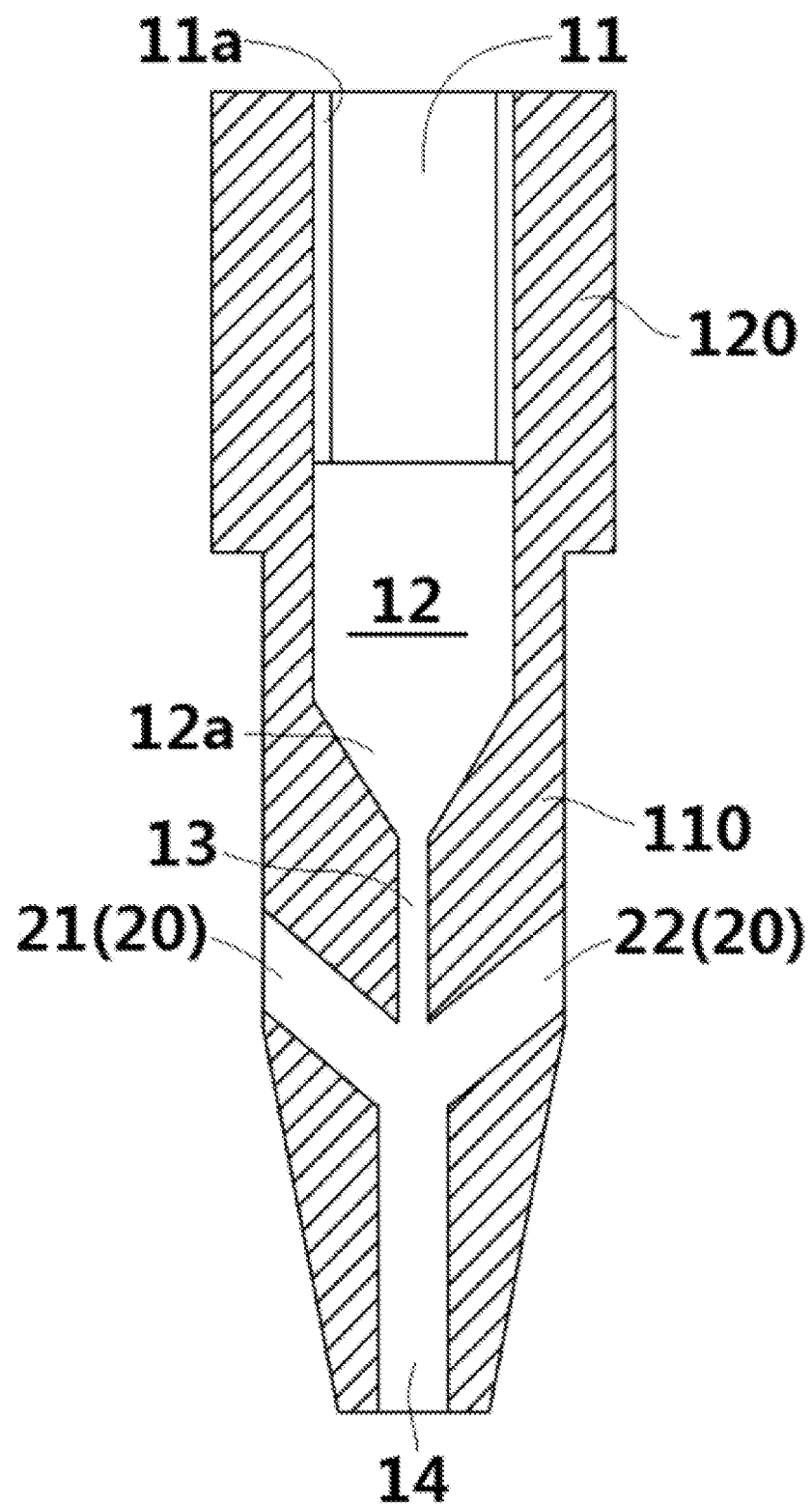
FIG. 3 is another sectional side view of the air nozzle of FIG. 1 in a thickness direction.

An air nozzle according to an embodiment, as shown in FIGS. 1 to 3, comprises a main body (110, 120) formed with a compressed air passageway (11, 12, 13, 14) to allow a compressed air to flow therethrough.

As shown in FIGS. 1 to 3, in the illustrated embodiment, the main body (110, 120) has a compensation air passageway 20 in communication with the compressed air passageway (11, 12, 13, 14). When the compressed air flows through the compressed air passageway (11, 12, 13, 14), an external air is sucked into the compressed air passageway (11, 12, 13, 14) through the compensation air passageway 20 and ejected together with the compressed air. Therefore, the present disclosure may save on the used quantity of compressed air and improve utilization rate of the compressed air, thereby facilitating improving quality of an electroplated product.

As shown in FIGS. 1 to 3, in the illustrated embodiment, the main body (110, 120) includes a first end and a second end opposite to each other in a height direction thereof. The compressed air passageway (11, 12, 13, 14) includes a plurality of compressed air outflow channels 14 at the first end of the main body (110, 120). The plurality of compressed air outflow channels 14 are arranged in a row in a width direction of the main body (110, 120).

As shown in FIGS. 1 to 3, in the illustrated embodiment, the main body (110, 120) includes a first side and a second side opposite to each other in a thickness direction thereof. The compensation air passageway 20 includes a plurality of first compensation air channels 21 at the first side of the main body (110, 120). The plurality of first compensation air channels 21 are arranged in a row in the width direction of the main body (110, 120) and communicate with the plurality of compressed air outflow channels 14, respectively. The compensation air passageway 20 further includes a plurality of second compensation air channels 22 at the second side of the main body (110, 120). The plurality of second compensation air channels 22 are arranged in a row in the width direction of the main body (110, 120) and communicate with the plurality of compressed air outflow channels 14, respectively.

As shown in FIGS. 2 and 3, in the illustrated embodiment, the compressed air outflow channels 14 extend in the height direction of the main body (110, 120). The first compensation air channels 21 and the second compensation air channels 22 obliquely intersect the compressed air outflow channels 14.

As shown in FIG. 3, in the illustrated embodiment, a first angle is formed between each first compensation air channel 21 and its corresponding compressed air outflow channel 14, and a second angle is formed between each second compensation air channel 22 and its corresponding compressed air outflow channel 14. The first angle is equal to the second angle, and each of the first angle and the second angle is greater than 90° and less than 180°. For example, each of the first angle and the second angle may be 120°, 130°, 140°, 150°, 160° or other suitable angles.

As shown in FIG. 3, in the illustrated embodiment, the first compensation air channel 21 and the second compensation air channel 22 are symmetrically arranged at either side of the corresponding compressed air outflow channel 14.

As shown in FIGS. 2 and 3, in the illustrated embodiment, the compressed air passageway (11, 12, 13, 14) further includes a compressed air inlet channel 11 at the second end of the main body (110, 120). The compressed air flows from the compressed air inlet channel 11 into the air nozzle, and is ejected from the air nozzle through outlets of the compressed air outflow channels 14.

As shown in FIGS. 2 and 3, in the illustrated embodiment, the compressed air passageway (11, 12, 13, 14) further includes a compressed air receiving cavity 12 within the main body (110, 120). The compressed air inlet channel 11 extends in the height direction of the main body (110, 120) and communicates with the compressed air receiving cavity 12.

As shown in FIGS. 2 and 3, in the illustrated embodiment, the compressed air passageway (11, 12, 13, 14) further includes a plurality of compressed air connection channels 13, each of which has a diameter less than that of a corresponding one of the compressed air outflow channels 14. The plurality of compressed air connection channels 13 connect the plurality of compressed air outflow channels 14 to the compressed air receiving cavity 12, respectively. The plurality of compressed air connection channels 13 extend in the height direction of the main body (110, 120), respectively, and a central axis of each of the compressed air connection channels 13 is coincident with that of a corresponding one of the compressed air outflow channels 14.

As shown in FIG. 3, in the illustrated embodiment, an input end of each of the compressed air outflow channels 14, an output end of a corresponding one of the first air compensation channels 21, an output end of a corresponding one of the second air compensation channels 22, and an output end of a corresponding one of the compressed air connection channels 13 intersect or are joined together at a location.

As shown in FIG. 3, in the illustrated embodiment, the compressed air receiving cavity 12 includes a tapered transition cavity 12a that is tapered toward the compressed air connection channel 13.

As shown in FIGS. 2 and 3, in the illustrated embodiment, an inner wall of an inlet of the compressed air inlet channel 11 is formed with an internal thread 11a suitable for threaded connection with a pipe joint of a compressed air supply device.

As shown in FIGS. 1 to 3, in the illustrated embodiment, the main body (110, 120) includes a block-shaped body portion 110, and a column-shaped connection portion 120 configured to be connected with the pipe joint of the compressed air supply device. The compressed air inlet channel 11 is formed in the connection portion 120. The compressed air receiving cavity 12, the compressed air connection channels 13, the compressed air outflow channels 14, the first air compensation channels 21 and the second air compensation channels 22 are formed in the body portion 110.

The air nozzle of the shown embodiment is configured to blow a plating solution or other fluids off a surface of a workpiece. The air nozzle of the present disclosure can improve quality of an electroplated product.

In another exemplary embodiment of the present disclosure, a method for manufacturing an air nozzle includes the following steps:

S100: providing a physical supporting member having a profile or configuration consistent with the compressed air passageway (11, 12, 13, 14) and the air compensation passageway 20 in the air nozzle to be manufactured;

S200: printing the main body (110, 120) of the air nozzle on the physical supporting member through a 3D printing process; and S300: removing the physical supporting member from the main body (110, 120) to obtain the air nozzle having the compressed air passageway (11, 12, 13, 14) and the air compensation passageway 20.

In an embodiment, the solid supporting member is made of a material, a melting temperature of which is lower than that of the main body (110, 120) of the air nozzle. For example, the solid supporting member may be made of wax, while the main body (110, 120) of the air nozzle may be made of plastic. In step S300, the solid supporting member may be heated to be melted and flow out of the main body (110, 120), so as to form the compressed air passageway (11, 12, 13, 14) and the air compensation passageway 20 in the main body (110, 120). For example, the printed main body (110, 120) may be hung in an oven or placed in a water tank under 60-70° C., so that the physical supporting member is removed from the main body (110, 120).

In another exemplary embodiment of the present disclosure, the solid supporting member is soluble in a corrosive fluid, and the main body (110, 120) of the air nozzle is insoluble in the corrosive fluid. In step S300, the printed main body (110, 120) is immersed in the corrosive fluid, so that the solid supporting member is dissolved into the corrosive fluid, so as to form the compressed air passageway (11, 12, 13, 14) and the air compensation passageway 20 in the main body (110, 120).

It should be appreciated by those skilled in this art that the above embodiments are intended to be illustrative, and many modifications may be made to the above embodiments by those skilled in this art. Further, various structures described in various embodiments may be freely combined with each other without conflicting in configuration or principle.

Although the disclosure has been described hereinbefore in detail with reference to the accompanying drawings, it should be appreciated that the disclosed embodiments in the accompanying drawings are intended to illustrate embodiments of the disclosure by way of example, and should not be construed as a limitation to the disclosure.

Although a few embodiments of the general inventive concept of the disclosure have been shown and described, it would be appreciated by those skilled in the art that changes or modifications may be made to these embodiments without departing from the principles and spirit of the general inventive concept, the scope of which is defined in claims and their equivalents.

It should be noted that, the word "comprise" or "include" doesn't exclude other elements or steps, and the word "a" or "an" doesn't exclude more than one. In addition, any reference numerals in the claims should not be interpreted as the limitation to the scope of the disclosure.

What is claimed is:

1. An air nozzle, comprising:
a main body having a compressed air passageway to allow a compressed air to flow therethrough and a compensation air passageway in communication with the compressed air passageway, an external air is sucked into the compressed air passageway through the compensation air passageway and ejected together with the compressed air when the compressed air flows through the compressed air passageway.

2. The air nozzle of claim 1, wherein the main body has a first end and a second end opposite to the first end in a height direction, the compressed air passageway has a plurality of compressed air outflow channels at the first end of the main body, the plurality of compressed air outflow channels are arranged in a row in a width direction of the main body.

3. The air nozzle of claim 2, wherein the main body has a first side and a second side opposite to the first side in a thickness direction, the compensation air passageway has a plurality of first compensation air channels at the first side of the main body, the plurality of first compensation air channels are arranged in a row in the width direction of the main body and communicate with the plurality of compressed air outflow channels.

4. The air nozzle of claim 3, wherein the compensation air passageway has a plurality of second compensation air channels at the second side of the main body, the plurality of second compensation air channels are arranged in a row in the width direction of the main body and communicate with the plurality of compressed air outflow channels.

5. The air nozzle of claim 4, wherein the compressed air outflow channels extend in the height direction of the main body, the first compensation air channels and the second compensation air channels obliquely intersect the compressed air outflow channels.

6. The air nozzle of claim 5, wherein a first angle is formed between each of the first compensation air channels and a corresponding one of the compressed air outflow channels, a second angle is formed between each of the second compensation air channels and a corresponding one of the compressed air outflow channels, the first angle is equal to the second angle and each of the first angle and the second angle is greater than 90° and less than 180°.

7. The air nozzle of claim 6, wherein the first compensation air channels and the second compensation air channels are symmetrically arranged at opposite sides of the compressed air outflow channels.

8. The air nozzle of claim 4, wherein the compressed air passageway has a compressed air inlet channel at the second end of the main body, the compressed air flows into the compressed air inlet channel and is ejected through a plurality of outlets of the compressed air outflow channels.

9. The air nozzle of claim 8, wherein the compressed air passageway has a compressed air receiving cavity within the main body, the compressed air inlet channel extends in the height direction of the main body and communicates with the compressed air receiving cavity.

10. The air nozzle of claim 9, wherein the compressed air passageway has a plurality of compressed air connection channels each having a diameter less than a diameter of a corresponding one of the compressed air outflow channels, the compressed air connection channels connect the compressed air outflow channels to the compressed air receiving cavity.

11. The air nozzle of claim 10, wherein the plurality of compressed air connection channels extend in the height direction of the main body, a central axis of each of the compressed air connection channels is coincident with a central axis of a corresponding one of the compressed air outflow channels.

12. The air nozzle of claim 11, wherein an input end of each of the compressed air outflow channels, an output end of a corresponding one of the first air compensation channels, an output end of a corresponding one of the second air compensation channels, and an output end of a corresponding one of the compressed air connection channels intersect at a location.

13. The air nozzle of claim 10, wherein the compressed air receiving cavity has a tapered transition cavity tapered toward the compressed air connection channels.

14. The air nozzle of claim 10, wherein an inner wall of an inlet of the compressed air inlet channel is formed with an internal thread suitable for threaded connection with a pipe joint of a compressed air supply device.

15. The air nozzle of claim 14, wherein the main body has a block-shaped body portion and a column-shaped connection portion connected with the pipe joint of the compressed air supply device.

16. The air nozzle of claim 15, wherein the compressed air inlet channel is formed in the column-shaped connection portion and the compressed air receiving cavity, the compressed air connection channels, the compressed air outflow channels, the first compensation air channels, and the second compensation air channels are formed in the block-shaped body portion.

17. The air nozzle of claim 1, wherein the air nozzle blows a plating solution or other fluids off a surface of a workpiece.

18. A method for manufacturing an air nozzle, comprising:
providing a physical supporting member having a profile consistent with a compressed air passageway and an air compensation passageway in the air nozzle to be manufactured;
printing a main body of the air nozzle onto the physical supporting member through a 3D printing process; and
removing the physical supporting member from the main body to obtain the air nozzle having the compressed air passageway and the air compensation passageway.

19. The method of claim 18, wherein the solid supporting member is made of a material having a melting temperature lower than a melting temperature of the main body of the air nozzle and, in the removing step, the solid supporting member is heated to be melted and flow out of the main body to form the compressed air passageway and the air compensation passageway in the main body.

20. The method of claim 18, wherein the solid supporting member is soluble in a corrosive fluid and the main body of the air nozzle is insoluble in the corrosive fluid, in the removing step, the printed main body is immersed in the corrosive fluid so that the solid supporting member is dissolved into the corrosive fluid, forming the compressed air passageway and the air compensation passageway in the main body.

\* \* \* \* \*